United States Patent
Li

(10) Patent No.: US 11,954,396 B2
(45) Date of Patent: Apr. 9, 2024

(54) SCREEN PROJECTION STATUS DETERMINING METHOD AND APPARATUS

(71) Applicant: TENCENT TECHNOLOGY (SHENZHEN) COMPANY LIMITED, Guangdong (CN)

(72) Inventor: Yang Li, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 17/891,375

(22) Filed: Aug. 19, 2022

(65) Prior Publication Data

US 2022/0398062 A1 Dec. 15, 2022

Related U.S. Application Data

(63) Continuation of application No. PCT/CN2021/100786, filed on Jun. 18, 2021.

(30) Foreign Application Priority Data

Aug. 5, 2020 (CN) .......................... 202010780140.0

(51) Int. Cl.
G06F 3/14 (2006.01)
G06F 3/16 (2006.01)

(52) U.S. Cl.
CPC ............ G06F 3/1454 (2013.01); G06F 3/165 (2013.01)

(58) Field of Classification Search
CPC ........ G06F 3/1454; G06F 3/165; G06F 3/167; G06F 11/10; G09G 2370/04
See application file for complete search history.

(56) References Cited

U.S. PATENT DOCUMENTS

| | | | |
|---|---|---|---|
| 2015/0033149 A1* | 1/2015 | Kuchoor | H04N 21/4782 |
| | | | 715/753 |
| 2017/0024100 A1* | 1/2017 | Pieper | G06F 40/40 |
| 2017/0322892 A1* | 11/2017 | Kobayashi | G06F 13/10 |
| 2018/0091758 A1* | 3/2018 | Lee | G06F 13/4282 |
| 2018/0247550 A1 | 8/2018 | Lu et al. | |
| 2020/0333945 A1* | 10/2020 | Wilson | G06F 3/04812 |

FOREIGN PATENT DOCUMENTS

| | | |
|---|---|---|
| CN | 110134355 | 8/2019 |
| CN | 110740288 | 1/2020 |
| CN | 110865783 | 3/2020 |
| CN | 111240905 | 6/2020 |

OTHER PUBLICATIONS

International Search Report dated Sep. 22, 2021 in International (PCT) Application No. PCT/CN2021/100786.

* cited by examiner

*Primary Examiner* — Sahlu Okebato
(74) *Attorney, Agent, or Firm* — Crowell & Moring LLP

(57) ABSTRACT

This disclosure relates to a method and apparatus for determining a screen projection status. The method may include, in response to a screen projection sharing operation, displaying screen projection sharing information on a current interface of a first terminal, and transmitting shared data corresponding to the screen projection sharing information to at least one second terminal. The shared data is for screen projection sharing. The method may further include performing screen projection sharing and displaying, on the current interface of the first terminal, a status identifier corresponding to a current screen projection status of each second terminal.

20 Claims, 9 Drawing Sheets

```
┌─────────────────────────────────────────────────────────────────────┐
│  In response to a screen projection sharing operation, display screen projection   │  S401
│  sharing information on a current interface of the first terminal, and transmit shared │
│  data corresponding to the screen projection sharing information to at least one   │
│  second terminal, the shared data being used for screen projection sharing         │
└─────────────────────────────────────────────────────────────────────┘
                                    │
                                    ▼
┌─────────────────────────────────────────────────────────────────────┐
│  Perform screen projection sharing and display, on the current interface of the first │  S402
│  terminal, a status identifier corresponding to a current screen projection status of │
│                          each second terminal                                      │
└─────────────────────────────────────────────────────────────────────┘
```

FIG. 4A

```
┌─────────────────────────────────────────────────────────────────────┐
│  Transmit shared data to at least one second terminal and transmit a screen projection │  S411
│  status detection request to each second terminal, where the screen projection status  │
│  detection request includes current projected data corresponding to the shared data    │
└─────────────────────────────────────────────────────────────────────┘
                                    │
                                    ▼
┌─────────────────────────────────────────────────────────────────────┐
│  Receive detected data that corresponds to the current projected data and that is sent │  S412
│                          by each second terminal                                       │
└─────────────────────────────────────────────────────────────────────┘
                                    │
                                    ▼
┌─────────────────────────────────────────────────────────────────────┐
│  Determine, according to the detected data of each second terminal and the current    │  S413
│  projected data, a current screen projection status corresponding to the second       │
│                                   terminal                                            │
└─────────────────────────────────────────────────────────────────────┘
                                    │
                                    ▼
┌─────────────────────────────────────────────────────────────────────┐
│  Display, on a current interface of the first terminal, a status identifier corresponding │  S414
│        to the current screen projection status of each second terminal                 │
└─────────────────────────────────────────────────────────────────────┘
```

SCREEN PROJECTION STATUS DETERMINING METHOD AND APPARATUS

RELATED APPLICATION

This application is a continuation application of PCT Patent Application No. PCT/CN2021/100786, filed on Jun. 18, 2021, which claims priority to Chinese Patent Application No. 202010780140.0, entitled " SCREEN PROJECTION STATUS DETERMINING METHOD AND APPARATUS, DEVICE, AND COMPUTER-READABLE STORAGE MEDIUM", filed with the China Intellectual Property Administration on Aug. 5, 2020, wherein the content of each of the above-referenced applications is incorporated herein by reference in its entirety.

FIELD OF THE TECHNOLOGY

This application relates to the field of Internet technologies, and relates to, but is not limited to, a screen projection status determining method and apparatus, a device, and a computer-readable storage medium.

BACKGROUND OF THE DISCLOSURE

In interactive scenarios such as daily online meetings and online education, after a projection screen sharing person sends a sharing request to terminals of receiving parties to share data (for example, a powerpoint (PPT) or a video), to determine whether the receiving parties may normally receive the shared data, the projection screen sharing person usually needs to ask participants "can you see my screen?", and some or all of the participants need to reply that they have seen the screen before interaction can actually begin. Obviously, in the related art, a screen projection status of a receiving party cannot be automatically detected, which affects interaction efficiency.

SUMMARY

Embodiments of this disclosure provide a screen projection status determining method and apparatus, a device, and a computer-readable storage medium, which can automatically detect a current screen projection status of a receiving party, thereby improving interaction efficiency.

The technical solutions in the embodiments of this disclosure are implemented as follows:

An embodiment of this disclosure provides a screen projection status determining method, applied to a first terminal of a screen projection party. The method may include, in response to a screen projection sharing operation, displaying screen projection sharing information on a current interface of the first terminal, and transmitting shared data corresponding to the screen projection sharing information to at least one second terminal. The shared data is for screen projection sharing. The method may further include performing screen projection sharing and displaying, on the current interface of the first terminal, a status identifier corresponding to a current screen projection status of each second terminal.

An embodiment of this disclosure provides a screen projection status determining apparatus or a first terminal. The apparatus or a first terminal may include a memory operable to store computer-readable instructions and a processor circuitry operable to read the computer-readable instructions. When executing the computer-readable instructions, the processor circuitry is configured to, in response to a screen projection sharing operation, display screen projection sharing information on a current interface of the first terminal, and transmit shared data corresponding to the screen projection sharing information to at least one second terminal. The shared data is for screen projection sharing. The processor circuitry is further configured to perform screen projection sharing and display, on the current interface of the first terminal, a status identifier corresponding to a current screen projection status of each second terminal.

An embodiment of this disclosure provides a non-transitory computer-readable media having instructions stored on the computer-readable media. The instructions are configured to, when executed, cause a machine or a first terminal to, in response to a screen projection sharing operation, display screen projection sharing information on a current interface of the first terminal, and transmit shared data corresponding to the screen projection sharing information to at least one second terminal. The shared data is for screen projection sharing. The instructions are further configured to cause the machine to perform screen projection sharing and display, on the current interface of the first terminal, a status identifier corresponding to a current screen projection status of each second terminal.

The embodiments of this disclosure have the following beneficial effects: the status identifier corresponding to the current screen projection status of each second terminal is displayed on the current interface of the first terminal when the first terminal performs screen projection sharing, which can automatically detect a current screen projection status of a receiving party, thereby improving interaction efficiency.

BRIEF DESCRIPTION OF THE DRAWINGS

FIG. 4A is a schematic flowchart of an implementation of a screen projection status determining method according to an embodiment of this disclosure;

FIG. 4B is a schematic flowchart of another implementation of a screen projection status determining method according to an embodiment of this disclosure;

DESCRIPTION OF EMBODIMENTS

Figure 1:
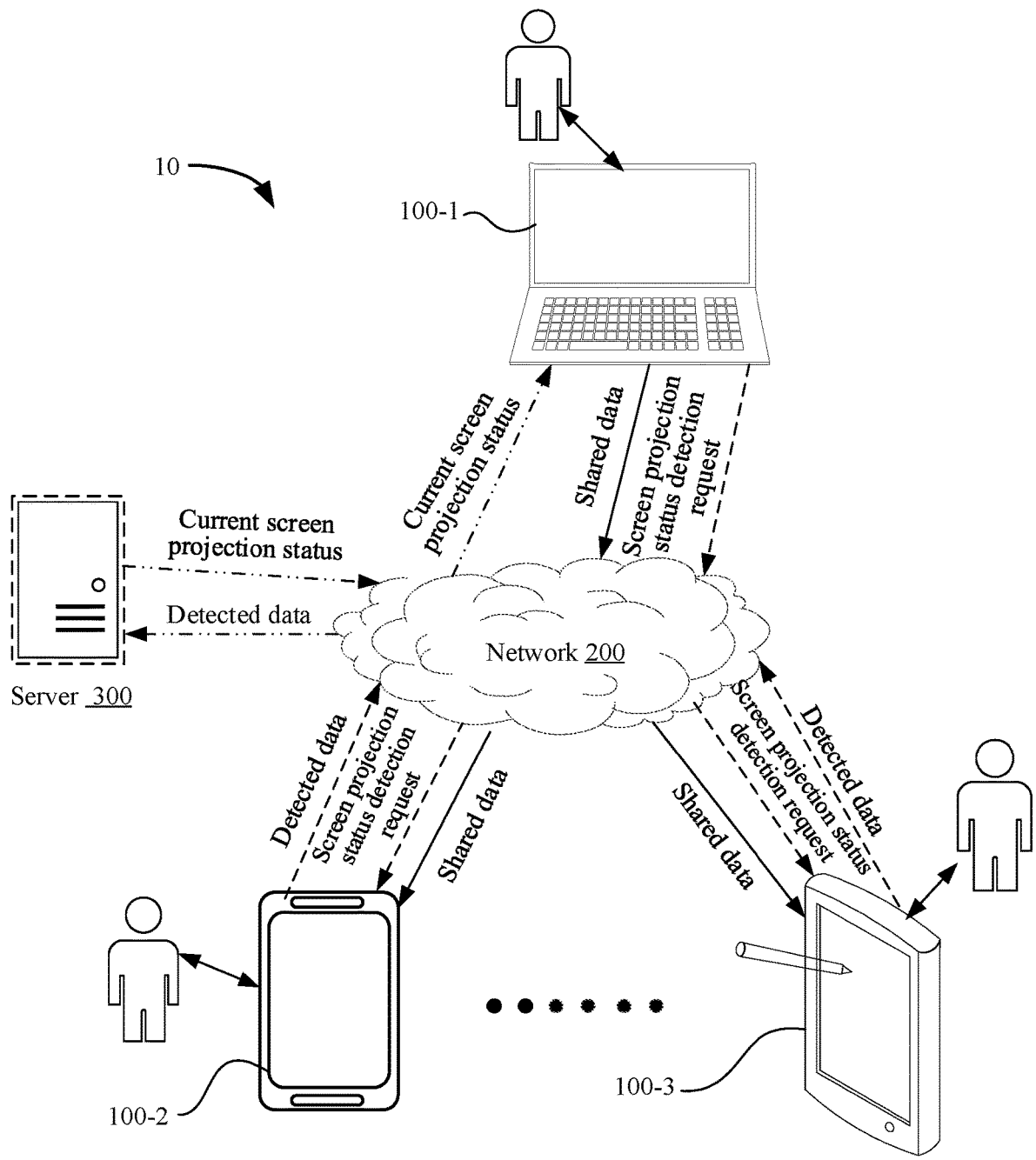
FIG. 1 is a schematic diagram of a network architecture for a screen projection status determining system according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, the term "some embodiments" describes subsets of all possible embodiments, but it may be understood that "some embodiments" may be the same subset or different subsets of all the possible embodiments, and can be combined with each other without conflict. Unless otherwise defined, meanings of all technical and scientific terms used in the embodiments of this disclosure are the same as those usually understood by a person skilled in the art to which the embodiments of this disclosure belongs. Terms used in the embodiments of this disclosure are merely intended to describe objectives of the embodiments of this disclosure, but are not intended to limit this disclosure.

The embodiments of this disclosure provide a screen projection status determining method. When receiving a screen projection sharing operation, in response to the screen projection sharing operation, a first terminal as a screen projection party displays screen projection sharing information on a current interface of the first terminal, and sends shared data corresponding to the screen projection sharing information to at least one second terminal of a receiving party for screen projection sharing; and displays, on the current interface of the first terminal when the first terminal performs screen projection sharing, a status identifier corresponding to a current screen projection status of each second terminal. In some embodiments, when the first terminal sends the shared data to the at least one second terminal, the first terminal sends a screen projection status detection request to each second terminal, where the screen projection status detection request includes current projected data corresponding to the shared data; receives detected data that corresponds to the current projected data and that is returned by each second terminal in response to the screen projection status detection request; determines, according to the detected data of each second terminal and the current projected data, the current screen projection status corresponding to the second terminal; and displays, on the current interface of the first terminal, a status identifier corresponding to a current screen projection status of each second terminal. In this way, a current screen projection status of a receiving party can be automatically detected, and a user as a screen projection party does not need to inquire the screen projection status from a user of the second terminal as the receiving party, thereby improving meeting efficiency and user experience.

The following describes an exemplary application of a terminal device provided by the embodiments of this disclosure. The terminal device is configured to implement the screen projection status determining method provided by the embodiments of this disclosure. The terminal device provided by the embodiments of this disclosure may be implemented as any terminal with a screen display function, a voice input and output function, and computing and data processing capabilities such as a notebook computer, a tablet computer, a desktop computer, a mobile device (for example, a mobile phone, a portable music player, a personal digital assistant, a dedicated messaging device, or a portable game device), an intelligent robot, or an in-vehicle terminal, and may also be implemented as a server. The following describes an exemplary application in which the screen projection status determining device is implemented as a terminal.

FIG. 1 is a schematic diagram of a network architecture of a screen projection status determining system 10 according to an embodiment of this disclosure. To support a meeting application for implementing a multi-party screen projection meeting, a first terminal 100-1 of a screen projection party and a second terminal of at least one receiving party (a second terminal 100-2 and a second terminal 100-3 are exemplarily shown) are connected to a server 300 through a network 200. The network 200 may be a wide area network or a local area network or a combination thereof.

The first terminal 100-1 is configured to display shared data and send the shared data to the server 300 through the network 200, the server sends the shared data to the second terminal 100-2 and the second terminal 100-3, and the second terminal 100-2 and the second terminal 100-3 of receiving parties of the shared data display the received data on current interfaces. When the first terminal 100-1 sends the shared data to the at least one second terminal, the first terminal 100-1 also sends a screen projection status detection request to the server through the network 200, where the screen projection status detection request includes current projected data corresponding to the shared data. The server sends the screen projection status detection request to the second terminal 100-2 and the second terminal 100-3, and receives detected data that corresponds to the current projected data and that is returned by the second terminal 100-2 and the second terminal 100-3 (for brevity and clarity of the accompanying drawings, the flow of signaling interaction between the server and the first terminal and the second terminal is not shown in FIG. 1). After receiving the detected data of the second terminal 100-2 and the second terminal 100-3, the server 300 determines a current screen projection status of the second terminal 100-2 and a current screen projection status of the second terminal 100-3 according to the detected data of the second terminal 100-2 and the second terminal 100-3 and the current projected data. The server 300 sends the current screen projection status of the second terminal 100-2 and the current screen projection status of the second terminal 100-3 to the first terminal 100-1 through the network 200. After receiving the current screen projection status of each second terminal, the first terminal 100-1 displays a status identifier corresponding to the current screen projection status of each second terminal on a current interface 110-1 of the first terminal.

In some embodiments, the server 300 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The first terminal 100-1, the second terminal 100-2, and the second terminal 100-3 may be smartphones, tablet computers, notebook computers, desktop computers, smart speakers, smart watches, in-vehicle devices, or the like, but are not limited thereto. The first terminal 100-1, the second terminal 100-2, the second terminal 100-3, and the server 300 may be directly or indirectly connected through wired or wireless communication. This is not limited in the embodiments of this disclosure.

In some embodiments, alternatively, the first terminal 100-1 may implement the step of determining the current screen projection status of the second terminal 100-2 and the current screen projection status of the second terminal 100-3 according to the detected data of the second terminal 100-2 and the second terminal 100-3 and the current projected data. Alternatively, the first terminal 100-1 corresponds to a server, each second terminal corresponds to a server, and all servers form a server cluster or a distributed system. The server corresponding to the first terminal 100-1 may implement the step of determining the current screen projection status of each second terminal, or the server corresponding to each second terminal may implement the step of determining the current screen projection status of the corresponding second terminal, and after determining the current screen projection status, send, through the network 200, the determined current screen projection status to the server corresponding to the first terminal 100-1.

The screen projection status determining method in the embodiments of this disclosure may also be implemented through a cloud technology based on a cloud platform. The cloud technology is a hosting technology in which a series of resources such as hardware, software, and networks are unified in a wide area network or a local area network to implement data computing, storage, processing, and sharing. Cloud technologies are a general term for a network technology, an information technology, an integration technology, a management platform technology, an application technology, and the like applied based on the business model of cloud computing, and may form a resource pool used on demand flexibly and conveniently. Cloud computing technologies will become an important support. The background service of a technical network system requires many computing and storage resources, for example, video websites, image websites, and more portal websites. With rapid development and application of the Internet industry, in the future, each item may have an identifier, all identifiers need to be transmitted to a background system for logical processing, data at different levels will be processed separately, and all types of industry data require powerful system support. This may be implemented only through cloud computing.

In the embodiments of this disclosure, determining the current screen projection status of each second terminal according to the detected data of the corresponding second terminal and the current projected data may be implemented through a cloud computing technology. According to the cloud computing technology, computing tasks (for example, tasks such as calculating similarity between the detected data of each second terminal and the current projected data) are distributed on a resource pool formed by a large number of computers, so that various application systems may obtain computing power, storage space, and information services as required. A network that provides resources is referred to as a "cloud". For a user, resources in a "cloud" seem to be infinitely expandable, and can be obtained readily, used on demand, expanded readily, and paid per use.

Figure 2:
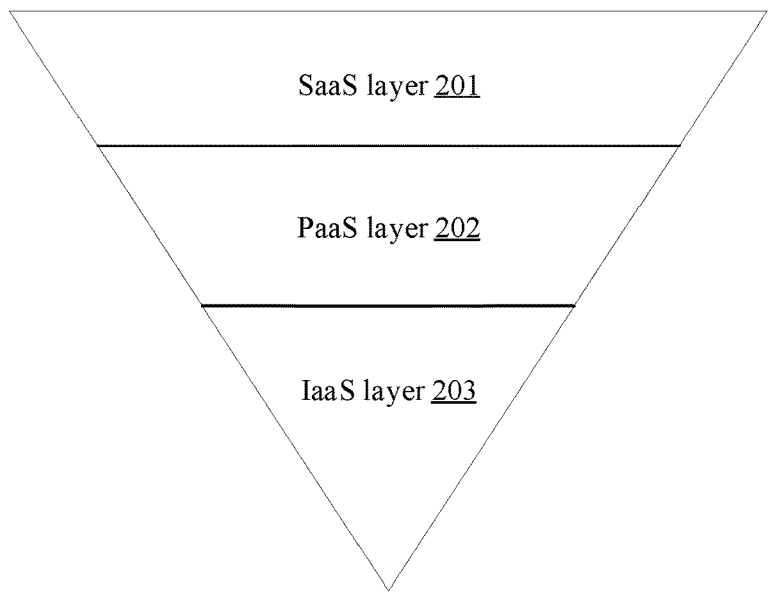
FIG. 2 is a diagram of a deployment relationship among an infrastructure as a service (IaaS) layer, a platform as a service (PaaS) layer, and a software as a service (SaaS) layer according to an embodiment of this disclosure.

As a basic capability provider of cloud computing, a cloud computing resource pool platform is established, which is abbreviated as a cloud platform and is generally referred to as an infrastructure as a service (IaaS), and various types of virtual resources are deployed in a resource pool for an external customer to select and use. A cloud computing resource pool mainly includes: a computing device (which is a virtualized machine and includes an operating system), a storage device, and a network device. According to logical functions, a platform as a service (PaaS) layer may be deployed on the IaaS layer, and a software as a service (SaaS) layer may be deployed on the PaaS layer, or the SaaS layer may be deployed directly on the IaaS layer. The PaaS layer is a platform on which software runs, for example, a database and a web container. The SaaS layer is a variety of service software, for example, a web portal or a bulk SMS message sender. A deployment relationship between an IaaS layer 203, a PaaS layer 202, and a SaaS layer 201 is shown in FIG. 2. Generally, the SaaS layer 201 and the PaaS layer 202 are upper layers relative to the IaaS layer 203.

In some embodiments, the screen projection status determining method in the embodiments of this disclosure may also be a screen projection status determining method corresponding to a cloud meeting. The cloud meeting is an efficient, convenient, and low-cost meeting form based on the cloud computing technology. A user only needs to perform a simple operation on an Internet interface to quickly and efficiently share a speech, a data file, and a video with teams and customers all over the world synchronously. A cloud meeting service provider helps the user to operate complex technologies such as data transmission and processing in the meeting. Currently, domestic cloud meetings mainly focus on service content mainly in the mode of software as a service (SaaS), including service forms such as a telephone, a network, a video, and the like. A video meeting based on cloud computing is referred to as a cloud meeting.

In the cloud meeting era, data transmission, processing, and storage are all performed by a computer resource of a video meeting manufacturer, and a user no longer needs to purchase expensive hardware and install cumbersome software and only needs to open a browser to log into a corresponding interface to have an efficient remote meeting. A cloud meeting system supports dynamic clustering deployment of multiple servers and provides multiple high-performance servers, which greatly improves meeting stability, security, and availability. In recent years, video meetings are welcomed by many users and are widely applied in government, military, transportation, transport, finance, operators, education, enterprises, and other fields because of improved communication efficiency, reduced communication costs, and internal management upgrade. Undoubtedly, after cloud computing is applied, video meetings become more attractive in terms of convenience, speed, and ease of usage, and surely will be applied more widely.

Figure 3:
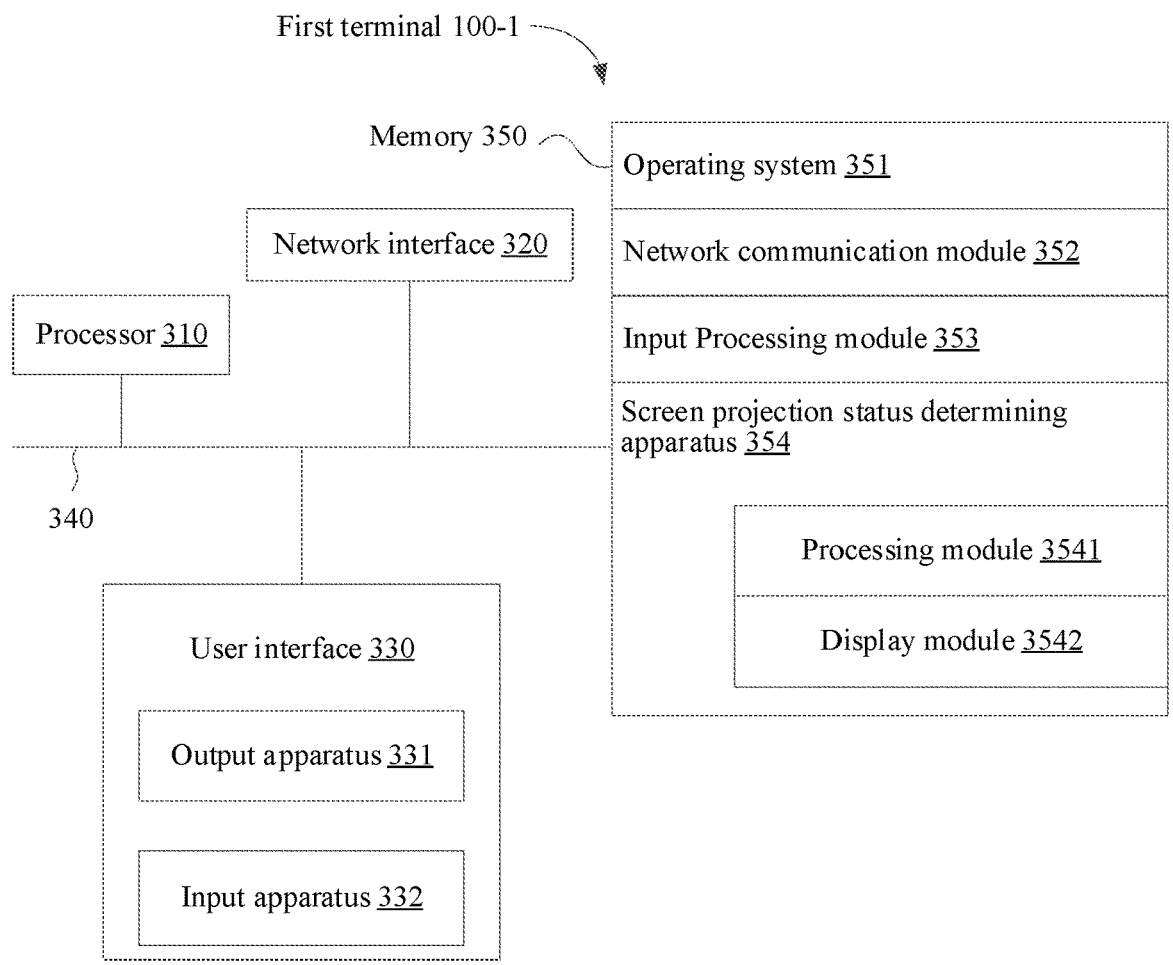
FIG. 3 is a schematic structural diagram of a first terminal according to an embodiment of this disclosure.

FIG. 3 is a schematic structural diagram of a first terminal 100-1 according to an embodiment of this disclosure. The first terminal 100-1 shown in FIG. 3 includes: at least one processor 310, a memory 350, at least one network interface 320, and a user interface 330. Various components in the first terminal 100-1 are coupled together through a bus system 340. It may be understood that the bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output apparatuses 331 that may display media content, and includes one or more speakers and/or one or more visual display screens. The user interface 330 also includes one or more input apparatuses 332, and includes user interface components that facilitate user input, for example, a keyboard, a mouse, a microphone, a touch display, a camera, and other input buttons and controls.

The memory 350 may be a removable memory, a non-removable memory, or a combination thereof. An exemplary hardware device includes a solid state memory, a hard disk driver, or an optical disc driver. The memory 350 may include one or more storage devices that are physically away from the processor 310. The memory 350 includes a transitory memory or a non-transitory memory, or may include a transitory memory and a non-transitory memory. The non-transitory memory may be a read only memory (ROM), and the transitory memory may be a random access memory (RAM). The memory 350 described in this embodiment of this disclosure is to include any other suitable type of memories. In some embodiments, the memory 350 may store data to support various operations, and examples of the data include programs, modules, and data structures, or subsets or supersets thereof, as exemplified below.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach another computing device through one or more (wired or wireless) network interfaces 320. Exemplary network interfaces 320 include: Bluetooth, wireless compatible authentication (Wi-Fi), a universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this disclosure may be implemented through software. FIG. 3 shows a screen projection status determining apparatus 354 stored in the memory 350. The screen projection status determining apparatus 354 may be a screen projection status determining apparatus in the first terminal 100-1, and may be software in the form of programs and plug-ins and include the following software modules: a processing module 3541 and a display module 3542. These modules are logical modules and therefore may be combined or divided according to functions to be implemented. The function of each module will be described below.

In some other embodiments, the second terminal 100-2 and the second terminal 100-3 may have the same structure as the first terminal 100-1 (not shown in the figure), and the difference only lies in screen projection status determining apparatuses stored in the memories in the second terminal 100-2 and the second terminal 100-3. The screen projection status determining apparatuses may be screen projection status determining apparatuses in the second terminal 100-2 and the second terminal 100-3, and may be software in the form of programs and plug-ins and include the following software modules: a second receiving module, a detection module, a second determining module, and a second sending module.

In still other embodiments, the apparatus provided by the embodiments of this disclosure may be implemented through hardware. As an example, the apparatus provided by the embodiments of this disclosure may be a processor in the form of a hardware decoding processor, and is programmed to execute the screen projection status determining method provided by the embodiments of this disclosure. For example, a processor in the form of a hardware decoding processor may be one or more application-specific integrated circuits (ASIC), a DSP, a programmable logic device (PLD), a complex programmable logic device (CPLD), a field-programmable gate array (FPGA), or other electronic components.

The screen projection status determining method provided by the embodiments of this disclosure will be described below with reference to the exemplary application and implementation of the first terminal 100-1 provided by the embodiments of this disclosure. FIG. 4A is a schematic flowchart of a screen projection status determining method according to an embodiment of this disclosure. The method will be described with reference to steps shown in FIG. 4A.

Step S401: In response to a screen projection sharing operation, display screen projection sharing information on a current interface of the first terminal, and transmit shared data corresponding to the screen projection sharing information to at least one second terminal of a receiving party, the shared data being used for screen projection sharing.

The screen projection sharing operation is an operation triggered by a user on the first terminal, for example, may be an operation of clicking on a button to start screen projection sharing by the user.

The current interface of the first terminal displays the screen projection sharing information during screen projection sharing, and at the same time, the shared data corresponding to the screen projection sharing information is shared with at least one second terminal. The screen projection sharing information includes at least one of the following: video information, image information, text information, voice information, and the like.

Step S402: Display, on the current interface of the first terminal when the first terminal performs screen projection sharing, a status identifier corresponding to a current screen projection status of each second terminal.

The current screen projection status includes, but is not limited to: successful screen projection, failed screen projection, being detected, and the like. When the second terminal successfully receives the shared data and displays the accurate shared data on the current interface of the second terminal, the current screen projection status of the second terminal is successful screen projection. When the second terminal fails to successfully receive the shared data or fails to display the accurate shared data on the current interface of the second terminal, the current screen projection status of the second terminal is failed screen projection. If the current screen projection status is being detected, it indicates that valid detected data fed back by the second terminal has not been obtained or a valid current screen projection status fed back by the second terminal has not been obtained.

According to the screen projection status determining method provided by this embodiment of this disclosure, the status identifier corresponding to the current screen projection status of each second terminal is displayed on the current interface of the first terminal when the first terminal performs screen projection sharing. In this way, a current screen projection status of a receiving party can be automatically detected, and a user as a screen projection party does not need to inquire the screen projection status from a user of the second terminal as the receiving party, thereby improving meeting efficiency and user experience.

Based on FIG. 4A, FIG. 4B is a schematic flowchart of another implementation of a screen projection status determining method according to an embodiment of this disclosure. As shown in FIG. 4B, the method may further include the following steps:

Step S411: When the first terminal transmits the shared data to the at least one second terminal, transmit a screen projection status detection request to each second terminal, where the screen projection status detection request includes current projected data corresponding to the shared data.

When the user as a screen projection party intends to share data with multiple users as receiving parties, the first terminal of the screen projection party may send the shared data to the second terminal of at least one receiving party to implement data sharing and screen projection sharing. For example, for a shared meeting, a screen projection party may share a PPT or a video with a receiving party. In this case, the screen projection party may share the PPT or the video with multiple receiving parties.

During screen projection sharing, to determine whether the receiving party has successfully received the shared data, or to determine the screen projection status of the receiving party, the screen projection status detection request may be sent to the second terminal of the receiving party. The screen projection status detection request is used to request to detect the current screen projection status of the second terminal.

The current projected data corresponding to the shared data is a part of data in the shared data or an attribute parameter corresponding to the shared data. The attribute parameter herein may include, but is not limited to, a data volume of the shared data, a type of shared data, and the like.

Step S412: Receive detected data that corresponds to the current projected data and that is sent by each second terminal.

The detected data is used to respond to the screen projection status detection request. After receiving the screen projection status detection request, each second terminal obtains, in response to the screen projection status detection request, detected data corresponding to the current projected data, where the detected data may be the current projected data or attribute information of the current projected data. For example, the attribute information may be information such as a data volume of the current projected data or a type of the current projected data.

In some embodiments, the current projected data corresponds to the shared data sent by the first terminal, and the detected data corresponds to the current projected data. For example, the current projected data of the first terminal may be at least one of text data, image data, and video data. Correspondingly, after the second terminal receives the shared data sent by the first terminal, data or detected data displayed on the second terminal at a current moment is also at least one of text data, image data, video data, and the like. Certainly, this only corresponds to successful screen projection. When the screen projection fails or any other case other than successful screen projection occurs, the detected data may be different from or may not correspond to the current projected data.

S413: Determine, according to the detected data of each second terminal and the current projected data, the current screen projection status corresponding to the second terminal.

The current screen projection status includes, but is not limited to: successful screen projection, failed screen projection, being detected, and the like. Determining the current screen projection status according to the detected data of the second terminal and the current projected data may be performing matching between the detected data and the current projected data. When the detected data matches the current projected data, it is determined that the current screen projection status corresponding to the second terminal is successful screen projection, and when the detected data does not match the current projected data, it is determined that the current screen projection status corresponding to the second terminal is failed screen projection. If the current screen projection status is being detected, it indicates that no valid detected data has been obtained.

Step S414: Display, on the current interface of the first terminal, a status identifier corresponding to a current screen projection status of each second terminal.

Each current screen projection status corresponds to a status identifier, and the status identifier may be a pattern identifier or a text identifier. After the current screen projection status of the second terminal is determined, the status identifier corresponding to the current screen projection status is obtained, and the status identifier of each second terminal is displayed on the current interface of the first terminal.

In this embodiment of this disclosure, the status identifier may be displayed within a preset time period after the meeting starts, that is, within a preset time period after data sharing starts, or the status identifier may be displayed in the entire data sharing process. The status identifier of each second terminal is not fixed, and changes with the change of the current screen projection status of the second terminal.

In this embodiment of this disclosure, a current screen projection status of each terminal may be continuously detected, or a current screen projection status of each terminal may be periodically detected, or current screen projection statuses of only some or all second terminals in the current meeting may be detected.

According to the screen projection status determining method provided by this embodiment of this disclosure, when the first terminal sends the shared data to the second terminal, the first terminal sends the screen projection status detection request to the second terminal, receives the detected data that corresponds to the current projected data and that is returned by the second terminal, and determines the current screen projection status of the second terminal according to the detected data and the current projected data. In this way, a current screen projection status of a receiving party can be automatically detected, and a user as a screen projection party does not need to inquire the screen projection status from a user of the second terminal as the receiving party, thereby improving meeting efficiency and user experience.

Figure 5:
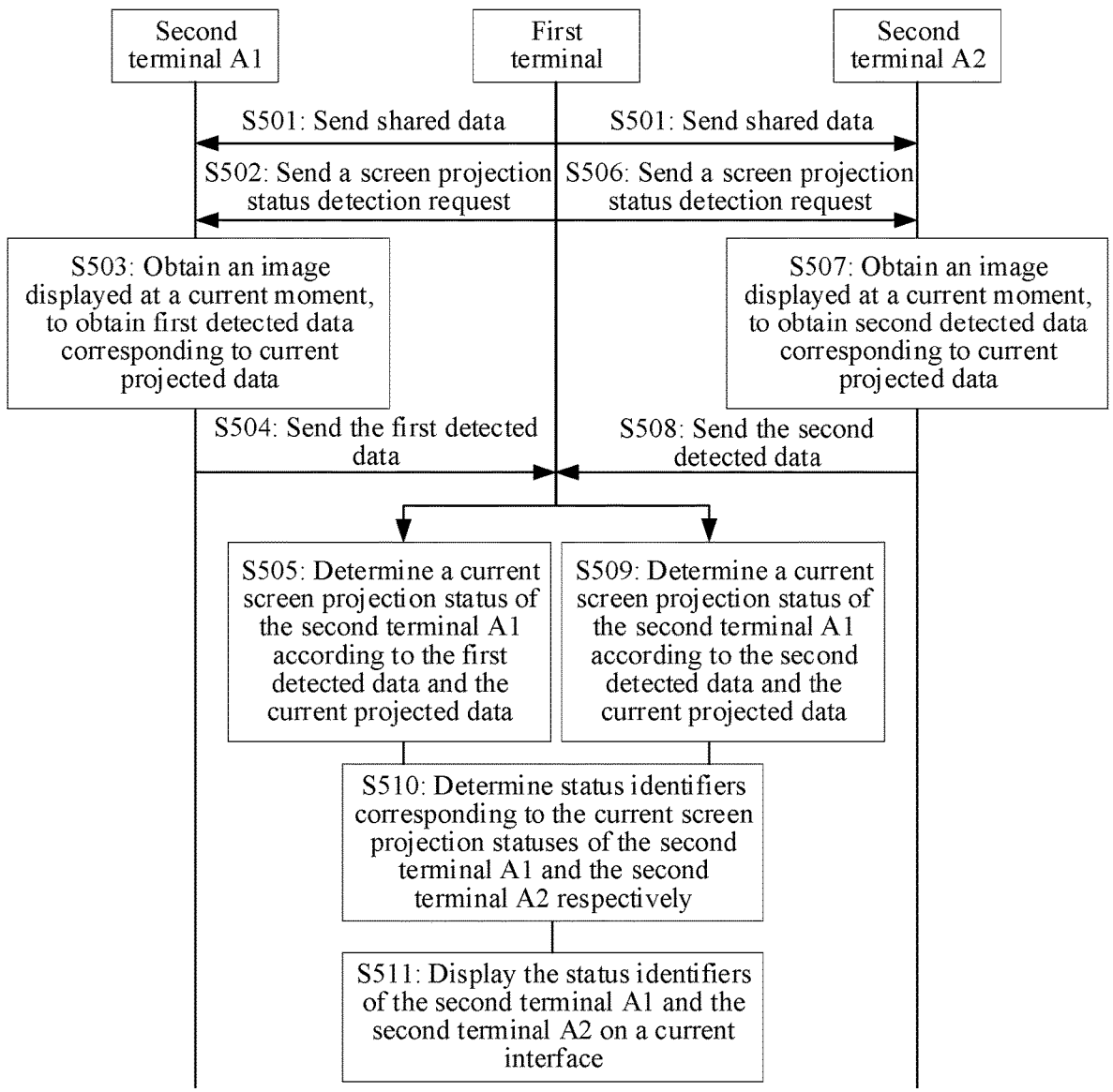
FIG. 5 is a schematic flowchart of still another implementation of a screen projection status determining method according to an embodiment of this disclosure.

In some embodiments, the screen projection status determining method may be implemented by multiple terminals in a screen projection status determining system. The screen projection status determining system includes a first terminal as a screen projection party and at least one second terminal as a shared data receiving party (in this embodiment of this disclosure, a second terminal A1 and a second terminal A2 are used as examples for description). FIG. 5 is a schematic flowchart of still another implementation of a screen projection status determining method according to an embodiment of this disclosure. As shown in FIG. 5, the method includes the following steps:

Step S501: A first terminal sends shared data to the second terminal A1 and the second terminal A2.

The shared data is used to perform screen projection sharing between the first terminal and the second terminal A1 and the second terminal A2. After a meeting starts, the first terminal may send the shared data to all second terminals participating in the meeting.

Step S502: The first terminal sends a screen projection status detection request to the second terminal A1 during screen projection sharing, where the screen projection status detection request includes current projected data corresponding to the shared data.

A user of the first terminal may trigger the screen projection status detection request on the interface of the first terminal, or the first terminal may automatically send the screen projection status detection request to the second terminal when the meeting starts.

In this embodiment of this disclosure, the screen projection status detection request may be sent to the second terminal A1 in at least any one of the following manners:

Manner 1: The screen projection status detection request is periodically sent to the second terminal A1.

Manner 2: The first terminal receives a trigger operation of a user, and in response to the trigger operation, sends the screen projection status detection request to the second terminal A1.

The trigger operation is an operation triggered by the user to perform screen projection status detection. For example, a trigger button may be displayed on the current page of the first terminal, and the user clicks on the trigger button to trigger the first terminal to send the screen projection status detection request to the second terminal A1.

In some embodiments, a uniform trigger button may be displayed on the current page of the first terminal and/or a trigger button corresponding to each second terminal may be displayed. When the user clicks on the uniform trigger button, the screen projection status detection request may be sent to all second terminals at the same time. Certainly, the user may alternatively need to send the screen projection status detection request only to some of multiple second terminals. Therefore, the user may click on a trigger button of a second terminal whose current screen projection status needs to be determined, to send the screen projection status detection request to the corresponding second terminal.

Manner 3: A next screen projection status detection request is sent to the second terminal A1 after detected data that corresponds to a screen projection status detection request of a current moment and that is returned by the second terminal A1 is received.

The next screen projection status detection request is not sent until the feedback that is on the current screen projection status detection request and that is from the second terminal is received. To be specific, after the feedback on the current screen projection status detection request is received, a current screen projection status may be determined, and then a screen projection status of a next moment needs to be automatically detected.

Manner 4: A screen projection status detection request is sent to the second terminal A1 again when detected data that corresponds to a screen projection status detection request of a current moment and that is returned by the second terminal A1 is not received within a preset time period.

If the detected data that corresponds to the screen projection status detection request of the current moment and that is returned by the second terminal is not received for a long time period, it indicates that sending of the screen projection status detection request of the current moment fails or the second terminal fails to receive the screen projection status detection request of the current moment. Therefore, the screen projection status detection request is sent to the second terminal again, that is, the screen projection status detection request is retransmitted.

Manner 5: When the screen projection sharing operation is received, the screen projection status detection request is sent to the second terminal A1 in response to the screen projection sharing operation.

The screen projection sharing operation may not only be a trigger operation for sending the shared data, but also a trigger operation for sending the screen projection status detection request. That is, when receiving the screen projection sharing operation of the user, the first terminal not only starts to send the shared data to the second terminal, but also sends the screen projection status detection request to the second terminal.

Step S503: In response to the screen projection status detection request, the second terminal A1 obtains an image currently displayed, to obtain first detected data corresponding to current projected data.

The first detected data is the image displayed at the current moment.

Step S504: The second terminal A1 sends the first detected data to the first terminal.

Step S505: The first terminal determines a current screen projection status of the second terminal A1 according to the first detected data and the current projected data.

The first terminal may calculate similarity between the first detected data and the current projected data, and determine the current screen projection status of the second terminal A1 according to the similarity between the first detected data and the current projected data.

In this embodiment of this disclosure, the first detected data is the image currently displayed by the second terminal A1, and the current projected data is the image currently displayed by the first terminal. During implementation of step S505, similarity between the image currently displayed by the second terminal A1 and the image currently displayed by the first terminal may be calculated first, then it is determined whether the similarity is greater than a preset similarity threshold, and when the similarity is greater than the similarity threshold, it is determined that the image currently displayed by the second terminal A1 is the same as the image currently displayed by the first terminal. In this case, it is determined that the current screen projection status of the second terminal A1 is successful screen projection. When the similarity is not greater than the similarity threshold, it is determined that the image currently displayed by the second terminal A1 is different from the image currently displayed by the first terminal. In this case, it is determined that the current screen projection status of the second terminal A1 is failed screen projection.

Step S506: The first terminal sends a screen projection status detection request to the second terminal A2 during screen projection sharing.

The screen projection status detection request includes the current projected data corresponding to the shared data.

The screen projection status detection request may also be sent to the second terminal A2 in at least any one of the following six manners:

Manner 1: The screen projection status detection request is periodically sent to the second terminal A2.

Manner 2: The first terminal receives a trigger operation of a user, and in response to the trigger operation, sends the screen projection status detection request to the second terminal A2.

Manner 3: A next screen projection status detection request is sent to the second terminal A2 after detected data that corresponds to a screen projection status detection request of a current moment and that is returned by the second terminal A2 is received.

Manner 4: A screen projection status detection request is sent to the second terminal A2 again when detected data that corresponds to a screen projection status detection request of a current moment and that is returned by the second terminal A2 is not received within a preset time period.

Manner 5: When the screen projection sharing operation is received, the screen projection status detection request is sent to the second terminal A2 in response to the screen projection sharing operation.

Manner 6: After detected data that corresponds to the screen projection status detection request of the current moment and that is returned by any other second terminal (for example, the second terminal A1) is received, if detected data that corresponds to the screen projection status detection request of the current moment and that is returned by the second terminal A2 is not received yet within a subsequent preset time period, the screen projection status detection request is sent to the second terminal A2 again.

Since the second terminal A1 has returned the detected data corresponding to the screen projection status detection request of the current moment, it indicates that the screen projection status detection request of the current moment has been sent successfully. The second terminal A2 does not perform feedback for a long time more probably because the second terminal A2 has not successfully received the screen projection status detection request of the current moment, and therefore, the screen projection status detection request is sent to the second terminal A2 again.

Step S507: In response to the screen projection status detection request, the second terminal A2 obtains an image currently displayed, to obtain second detected data corresponding to the current projected data.

Step S508: The second terminal A2 sends the second detected data to the first terminal.

Step S509: The first terminal determines a current screen projection status of the second terminal A2 according to the second detected data and the current projected data.

Step S506 to step S509 are the same as step S502 to step S505, and for an implementation process, refer to step S502 to step S505.

Step S510: Determine status identifiers corresponding to the current screen projection statuses of the second terminal A1 and the second terminal A2 respectively.

Each current screen projection status corresponds to a status identifier. After the current screen projection statuses of the second terminal A1 and the second terminal A2 are determined, the status identifiers corresponding to the current screen projection statuses of the second terminal A1 and the second terminal A2 are determined respectively.

In some embodiments, the first terminal may store a list of mapping relationships between screen projection statuses and status identifiers, and the status identifiers corresponding to the current screen projection statuses of the second terminal A1 and the second terminal A2 may be found from the list of mapping relationships.

Step S511: Display the status identifiers of the second terminal A1 and the second terminal A2 on a current interface of the first terminal.

In the screen projection status determining method provided by this embodiment of this disclosure, when sending the shared data to the second terminal A1 and the second terminal A2, the first terminal sends the screen projection status detection request to the second terminal A1 and the second terminal A2, receives the first detected data and the second detected data that correspond to the current projected data and that are returned by the second terminal A1 and the second terminal A2, and sequentially determines the current screen projection statuses of the second terminal A1 and the second terminal A2 according to the first detected data, the second detected data, and the current projected data. In this way, the current screen projection statuses of different receiving parties can be automatically detected, and a user as a screen projection party does not need to inquire the screen projection statuses from users of the second terminal A1 and the second terminal A2 as receiving parties. This implements automatic detection of a screen projection status in multi-person interaction, thereby greatly improving interaction efficiency.

Figure 6:
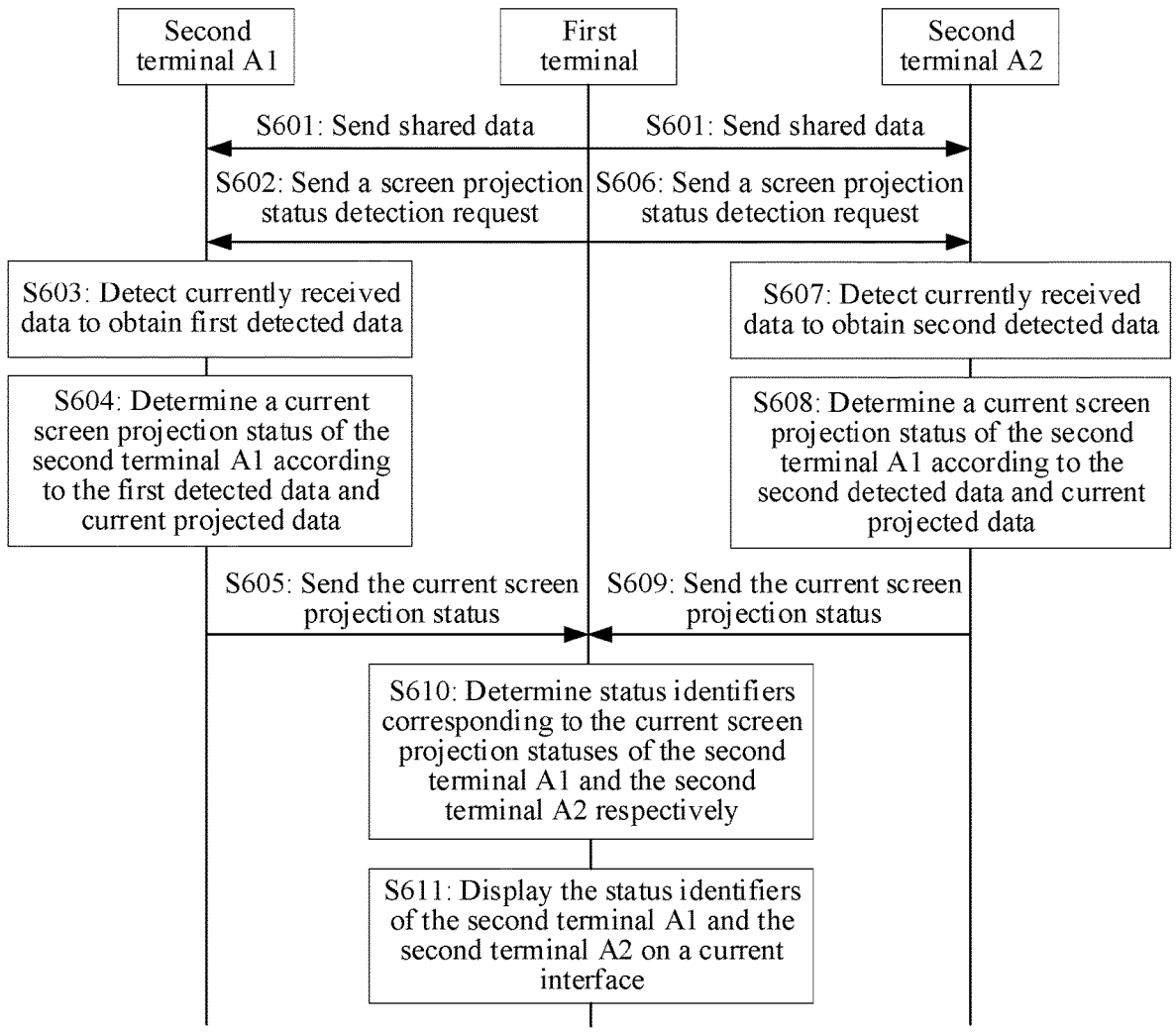
FIG. 6 is a schematic flowchart of still another implementation of a screen projection status determining method according to an embodiment of this disclosure.

In some embodiments, the step of determining the current screen projection status of the second terminal may also be implemented by the second terminal. FIG. 6 is a schematic flowchart of still another implementation of a screen projection status determining method according to an embodiment of this disclosure. As shown in FIG. 6, the method includes the following steps:

Step S601: A first terminal sends shared data to a second terminal A1 and a second terminal A2, to implement screen projection sharing between the first terminal and the second terminal A1 and the second terminal A2.

Step S602: The first terminal sends a screen projection status detection request to the second terminal A1 during screen projection sharing.

The screen projection status detection request includes current projected data corresponding to the shared data.

Step S603: The second terminal A1 detects currently received data to obtain first detected data.

Step S604: The second terminal A1 determines a current screen projection status of the second terminal A1 according to the first detected data and the current projected data.

In this embodiment of this disclosure, the second terminal as a receiving party implements the step of determining the current screen projection status of the second terminal. In this way, a data calculation volume may be allocated to multiple second terminals, and the first terminal may avoid a large number of data calculation, thereby increasing the data calculation speed and improving the efficiency of screen projection status detection.

Step S605: The second terminal A1 sends the current screen projection status to the first terminal.

The first terminal only needs to receive the current screen projection status returned by the second terminal and does not need to perform calculation.

Step S606: The first terminal sends a screen projection status detection request to the second terminal A2 during screen projection sharing.

The screen projection status detection request includes the current projected data corresponding to the shared data.

Step S607: The second terminal A2 detects currently received data to obtain second detected data.

Step S608: The second terminal A2 determines a current screen projection status of the second terminal A2 according to the second detected data and the current projected data.

Step S609: The second terminal A2 sends the current screen projection status to the first terminal.

Step S606 to step S609 are the same as step S602 to step S605, and for an implementation process, refer to step S602 to step S605.

Step S610: The first terminal determines status identifiers corresponding to the current screen projection statuses of the second terminal A1 and the second terminal A2 respectively.

Step S611: Display the status identifiers of the second terminal A1 and the second terminal A2 on a current interface of the first terminal.

Figure 7:
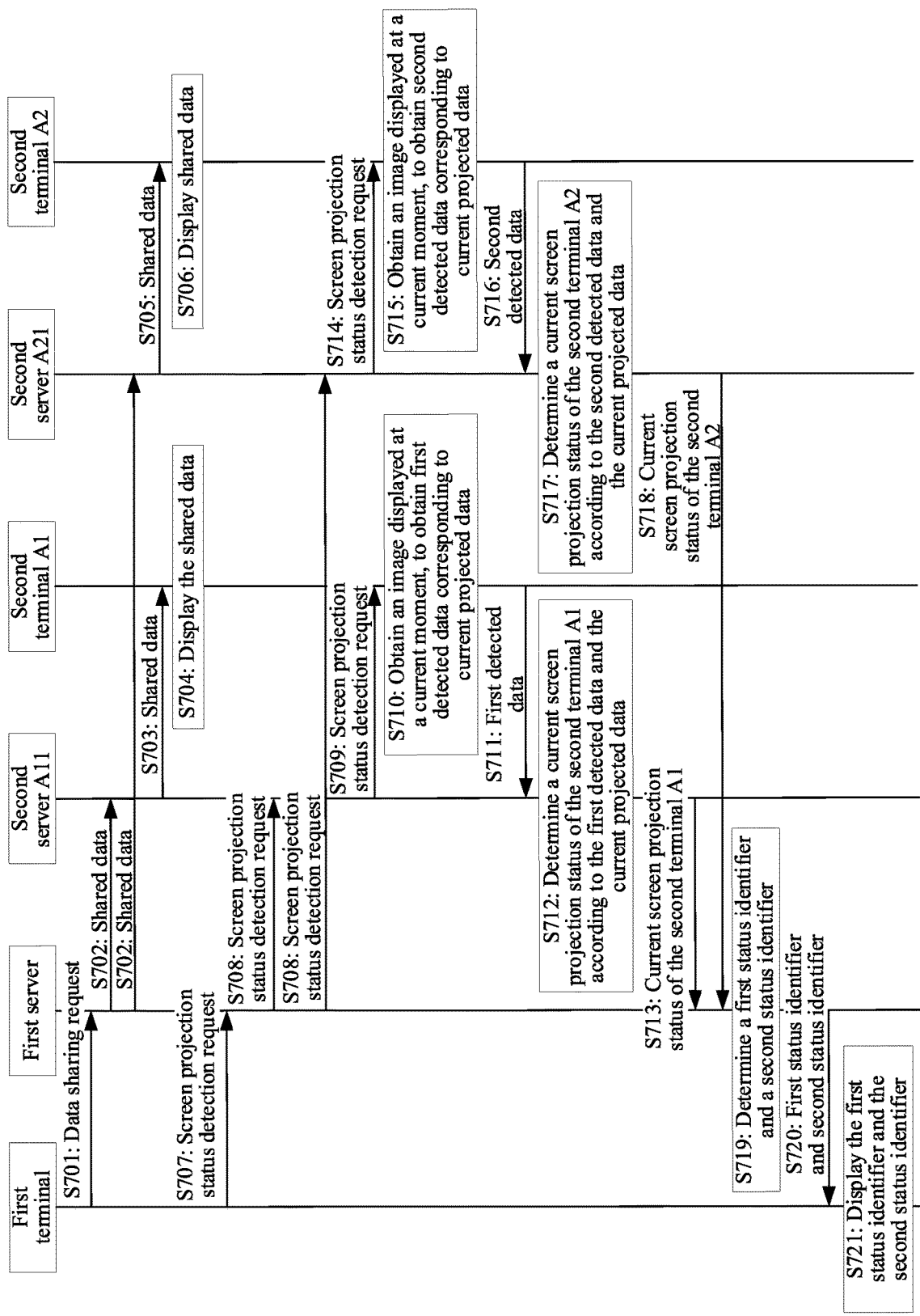
FIG. 7 is a schematic flowchart of still another implementation of a screen projection status determining method according to an embodiment of this disclosure.

In some embodiments, the screen projection status determining method may also be implemented by a server in a distributed server system. A screen projection status determining system includes a first terminal, a first server corresponding to the first terminal, at least one second terminal (in this embodiment, the second terminal A1 and the second terminal A2 are used as examples for description), and a second server corresponding to each second terminal (in this embodiment, a second server A11 corresponding to the second terminal A1 and a second server A21 corresponding to the second terminal A2 are used as examples for description). FIG. 7 is a schematic flowchart of still another implementation of a screen projection status determining method according to an embodiment of this disclosure. As shown in FIG. 7, the method includes the following steps:

Step S701: A first terminal sends a data sharing request to a first server in response to a user operation.

The data sharing request includes shared data.

Step S702: The first server sends the shared data to a second server A11 and a second server A21.

Step S703: The second server A11 sends the shared data to a second terminal A1.

Step S704: The second terminal A1 displays the shared data on a current interface, to implement screen projection sharing between the first terminal and the second terminal A1.

Step S705: The second server A21 sends the shared data to a second terminal A2.

Step S706. The second terminal A2 displays the shared data on a current interface, where the shared data is used to implement screen projection sharing between the first terminal and the second terminal A2.

Step S707: During screen projection sharing, the first terminal sends a screen projection status detection request to the first server, where the screen projection status detection request includes current projected data corresponding to the shared data.

Step S708: The first server sends the screen projection status detection request to the second server A11 and the second server A21.

Step S709: The second server A11 sends the screen projection status detection request to the second terminal A1.

Step S710: In response to the screen projection status detection request, the second terminal A1 obtains an image currently displayed, to obtain first detected data corresponding to the current projected data.

Step S711: The second terminal A1 sends the first detected data to the second server A11.

Step S712: The second server A11 determines a current screen projection status of the second terminal A1 according to the first detected data and the current projected data.

Step S713: The second server A11 sends the current screen projection status of the second terminal A1 to the first server.

Step S714: The second server A21 sends the screen projection status detection request to the second terminal A2.

Step S715: In response to the screen projection status detection request, the second terminal A2 obtains an image currently displayed, to obtain second detected data corresponding to the current projected data.

Step S716: The second terminal A2 sends the second detected data to the second server A21.

Step S717: The second server A21 determines a current screen projection status of the second terminal A2 according to the second detected data and the current projected data.

Step S718: The second server A21 sends the current screen projection status of the second terminal A2 to the first server.

Step S719: The first server respectively determines a first status identifier corresponding to the current screen projection status of the second terminal A1 and a second status identifier corresponding to the current screen projection status of the second terminal A2.

Step S720: The first server sends the first status identifier and the second status identifier to the first terminal.

Step S721: The first terminal displays the first status identifier and the second status identifier on the current interface.

In this embodiment of this disclosure, the first server, the second server A11, and the second server A21 in the distributed system jointly implement detection of the screen projection status of each second terminal in the screen projection status determining system. Since a large volume of calculation is allocated to multiple servers in the distributed system, the data processing efficiency can be effectively improved, the detection effect and the detection accuracy of the screen projection status can be ensured, and the meeting efficiency and quality can be improved.

Figure 8:
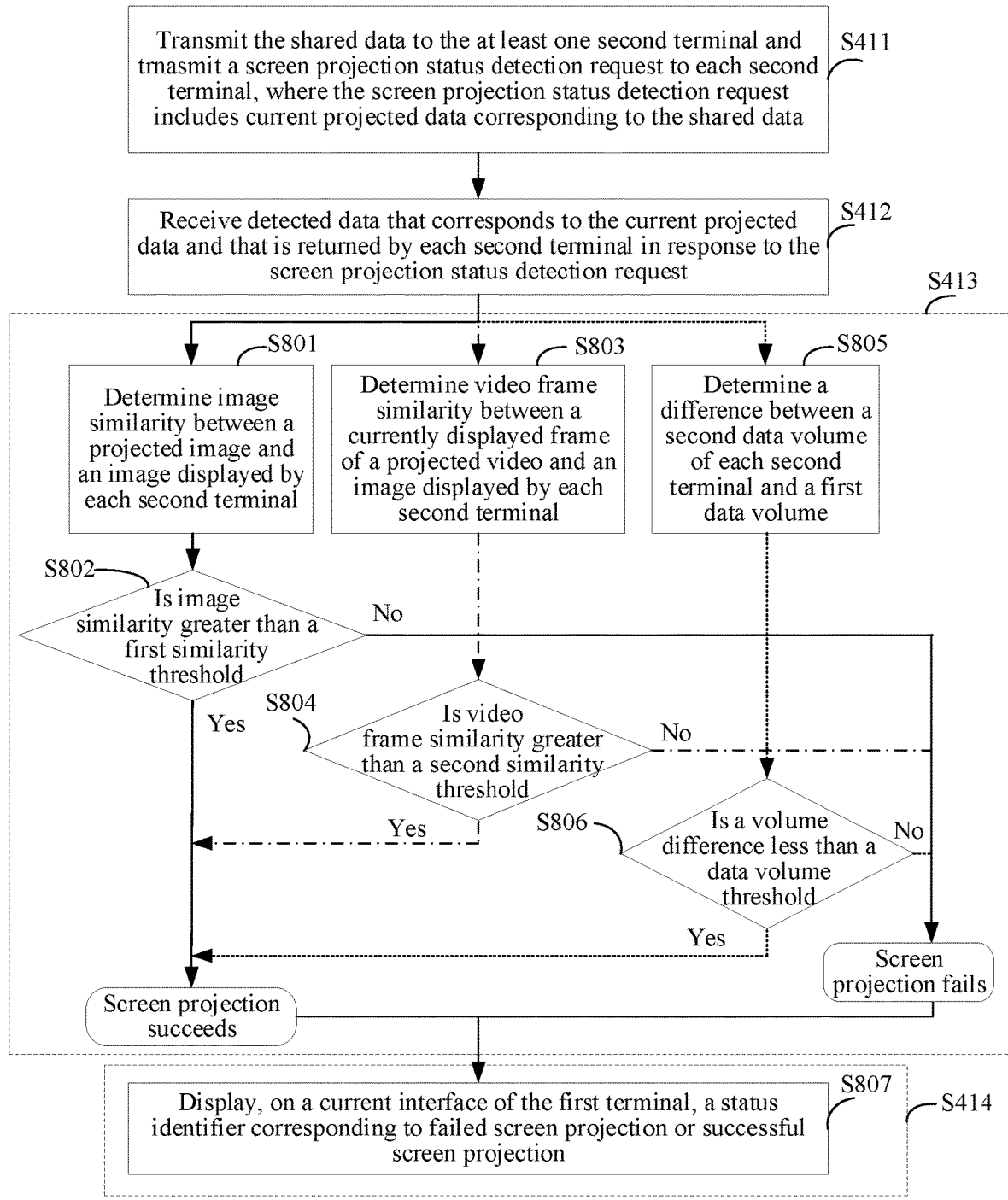
FIG. 8 is a schematic flowchart of still another implementation of a screen projection status determining method according to an embodiment of this disclosure.

Based on FIG. 4B, FIG. 8 is a schematic flowchart of still another implementation of a screen projection status determining method according to an embodiment of this disclosure. As shown in FIG. 8, in some embodiments, current projected data is a projected image, and the detected data is an image currently displayed by the second terminal. Correspondingly, step S413 may be implemented through the following steps:

Step S801: Determine image similarity between a projected image and an image displayed by each second terminal.

Step S802: Determine whether the image similarity is greater than a first similarity threshold.

If a determining result is yes, it is determined that a current screen projection status corresponding to the second terminal is successful screen projection. If a determining result is no, it is determined that a current screen projection status corresponding to the second terminal is failed screen projection.

In this embodiment of this disclosure, when the image similarity between the projected image and the image currently displayed by the second terminal is greater than the first similarity threshold, it indicates that the image currently displayed by the second terminal is similar to or consistent with the projected image sent by the first terminal of a screen projection party. Therefore, it may be determined that the second terminal has successfully received the current projected data and has effectively displayed the projected image corresponding to the current projected data on the current interface. In this case, it is determined that screen projection succeeds.

Still referring to FIG. 8, in some embodiments, the current projected data is a projected video, and the detected data is an image currently displayed by the second terminal. Correspondingly, step S413 may be implemented through the following steps:

Step S803: Determine video frame similarity between a currently displayed frame of a projected video and an image displayed by each second terminal.

Step S804: Determine whether the video frame similarity is greater than a second similarity threshold.

If a determining result is yes, it is determined that a current screen projection status corresponding to the second terminal is successful screen projection. If a determining result is no, it is determined that a current screen projection status corresponding to the second terminal is failed screen projection.

In this embodiment of this disclosure, when the video frame similarity between the currently displayed frame of the projected video and the image currently displayed by the second terminal is greater than the second similarity threshold, it indicates that the image currently displayed by the second terminal is similar to or consistent with the currently displayed video frame of the projected video sent by the first terminal of a screen projection party. Therefore, it may be determined that the second terminal has successfully received the current projected data and has effectively displayed the video frame corresponding to the current projected data on the current interface. In this case, it is determined that screen projection succeeds.

Still referring to FIG. 8, in some embodiments, the current projected data is a first data volume of the shared data sent by the first terminal, and the detected data is a second data volume of data received by the second terminal. Correspondingly, step S413 may be implemented through the following steps:

Step S805: Determine a volume difference between a second data volume of each second terminal and a first data volume.

Step S806: Determine whether the volume difference is less than a data volume threshold.

If a determining result is yes, it is determined that a current screen projection status corresponding to the second terminal is successful screen projection. If a determining result is no, it is determined that a current screen projection status corresponding to the second terminal is failed screen projection.

In this embodiment of this disclosure, when the volume difference between the second data volume currently received by the second terminal (a volume of the data to be received) and the first data volume of the shared data is less than the data volume threshold, it indicates that the second data volume currently received by the second terminal is similar to or consistent with the first data volume of the shared data sent by the first terminal of the screen projection party. Therefore, it may be determined that the second terminal has successfully received the current projected data. In this case, it is determined that screen projection succeeds.

In FIG. 8, although step S413 includes step S801, step S802, step S803, step S804, step S805, and step S806, in an actual implementation process, step S801 and step S802 are an implementation, step S803 and step S804 are an implementation, and step S805 and step S806 are an implementation. Step S413 may be implemented through any one of the three implementations.

Correspondingly, step S414 may be implemented through the following step:

Step S807: Display, on the current interface of the first terminal, a status identifier corresponding to failed screen projection or successful screen projection.

Figure 9:
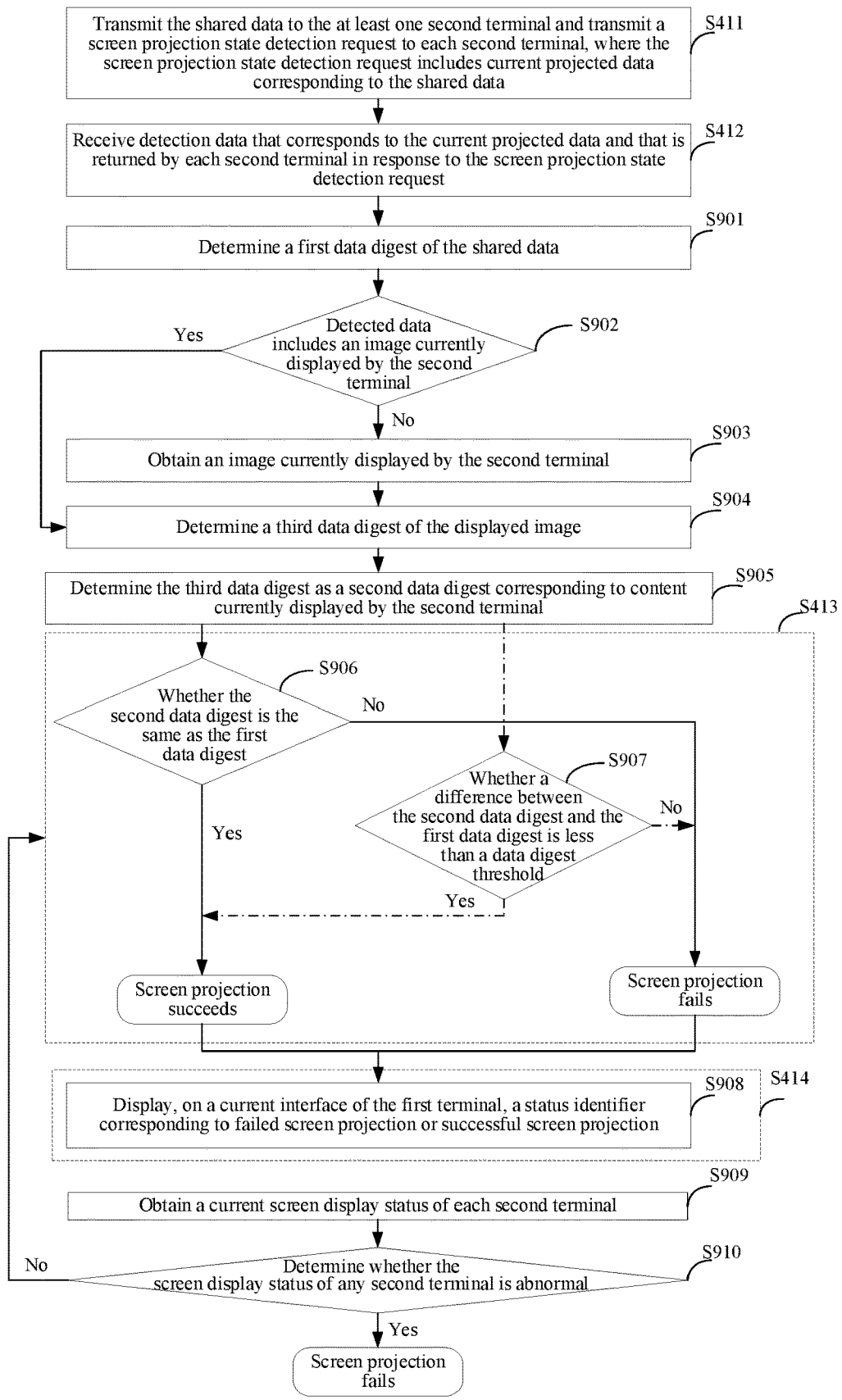
FIG. 9 is a schematic flowchart of still another implementation of a screen projection status determining method according to an embodiment of this disclosure.

Based on FIG. 4B, FIG. 9 is a schematic flowchart of still another implementation of a screen projection status determining method according to an embodiment of this disclosure. As shown in FIG. 9, in some embodiments, the current projected data is a first data digest of the shared data, and the detected data at least includes a second data digest of content currently displayed by the second terminal. Before step S413, the method further includes:

Step S901: Determine a first data digest of the shared data.

During implementation, a preset digest algorithm may be used to determine the data digest of the shared data. For example, the digest algorithm may be a message digest (MD5) algorithm. Correspondingly, the first data digest in this step may be a first MD5 value of the shared data.

Step S902: Determine whether the detected data includes an image currently displayed by the second terminal.

If a determining result is yes, perform step S904. If a determining result is no, perform step S903.

Step S903: Obtain an image currently displayed by the second terminal.

Step S904: Determine a third data digest of the displayed image.

Step S905: Determine the third data digest as a second data digest corresponding to content currently displayed by the second terminal.

Correspondingly, step S413 may be implemented through the following step:

Step S906: Determine whether the second data digest is the same as the first data digest.

If a determining result is yes, it is determined that a current screen projection status corresponding to the second terminal is successful screen projection. If a determining result is no, it is determined that a current screen projection status corresponding to the second terminal is failed screen projection.

In this embodiment of this disclosure, when the second data digest of the content currently displayed by the second terminal is the same as the first data digest of the shared data, it indicates that the content currently displayed by the second terminal is consistent with the shared data sent by the first terminal of a screen projection party. Therefore, it may be determined that the second terminal has successfully received the current projected data and has effectively displayed the displayed content corresponding to the current projected data on the current interface. In this case, it is determined that screen projection succeeds.

In some embodiments, step S413 may also be implemented through the following step:

Step S907: Determine whether a difference between the second data digest of the second terminal and the first data digest is less than a data digest threshold.

If a determining result is yes, it is determined that a current screen projection status corresponding to the second terminal is successful screen projection. If a determining result is no, it is determined that a current screen projection status corresponding to the second terminal is failed screen projection.

If the difference between the second data digest of the second terminal and the first data digest is less than the data digest threshold, it indicates that the content currently displayed by the second terminal is similar to the shared data sent by the first terminal of the screen projection party. Therefore, it may also be determined that the second terminal has successfully received the current projected data, and has effectively displayed the displayed content corresponding to the current projected data on the current interface. In this case, it is determined that screen projection succeeds.

Correspondingly, step S414 may be implemented through the following step:

Step S908: Display, on the current interface of the first terminal, a status identifier corresponding to failed screen projection or successful screen projection.

Still referring to FIG. 9, in some embodiments, the method further includes:

Step S909: Obtain a current screen display status of each second terminal.

Step S910: Determine whether a screen display status of any second terminal is abnormal.

The abnormal screen display status includes, but is not limited to, abnormal cases such as a black screen, incomplete display, and an unclear displayed image. If a determining result is yes, it is determined that the current screen projection status corresponding to the second terminal is failed screen projection. If a determining result is no, return to perform step S413, that is, return to perform step S906 or step S907.

Still referring to FIG. 9, in some embodiments, the method further includes:

Step S91: After transmitting the screen projection status detection request to the second terminal and before receiving the detected data returned by the second terminal, determine that the current screen projection status of the second terminal is a detection status.

After transmitting the screen projection status detection request to the second terminal and before receiving the detected data returned by the second terminal, the first terminal has not received the detected data and waits to receive the detected data. Therefore, it is determined that the current screen projection status of the second terminal is a detection status.

Step S92: When the detected data returned by the second terminal is not received within a preset time period, determine that the current screen projection status of the second terminal is failed screen projection.

In the screen projection status determining method provided by this embodiment of this disclosure, the current screen projection status of the second terminal is determined by using different detection methods, so that different screen projection statuses of the second terminal may be accurately detected.

The following describes an exemplary application of this embodiment of this disclosure in an actual application scenario.

An embodiment of this disclosure provides a screen projection status determining method. The method mainly includes three parts: a first part, where when screen projection starts, a screen projection party starts a host service to initiate a customized check protocol to a participant (corresponding to the receiving party in other embodiments); a second part, where after receiving the check protocol, the participant starts a check service, performs screen projection status check, and sends a check result to the screen projection party based on the check protocol; and a third part, where the screen projection party summarizes data of the check result through the host service and makes a decision, and the screen projection party and all participants of the meeting are reminded about the check result.

Figure 10:
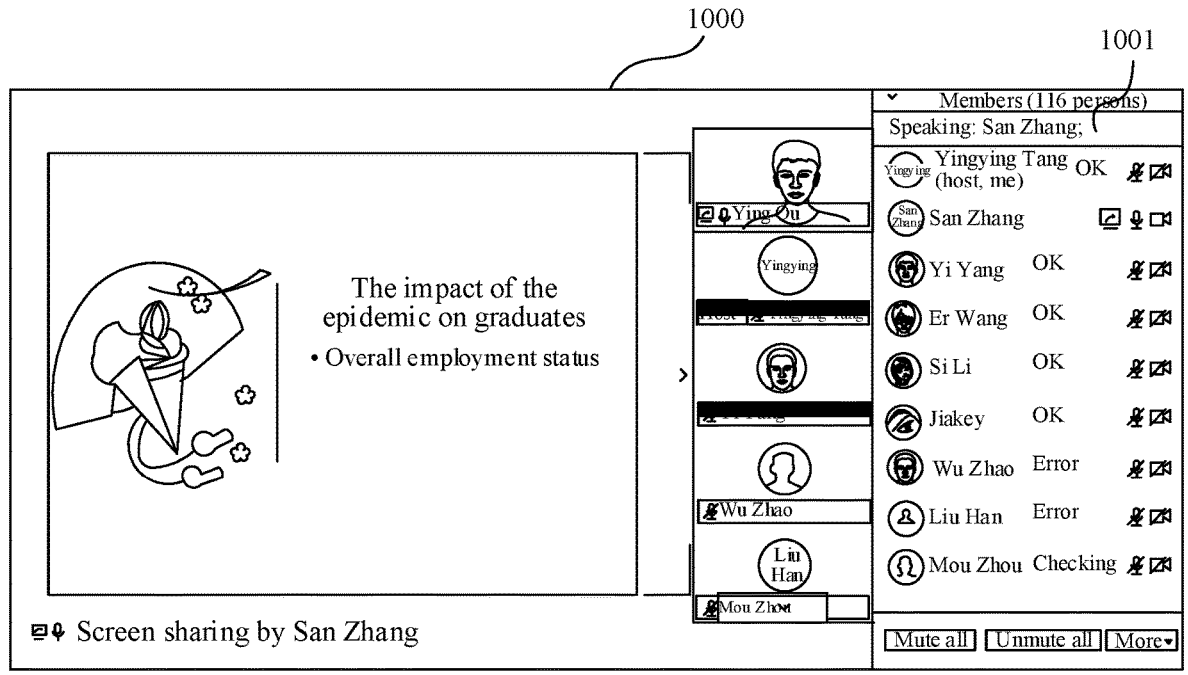
FIG. 10 is a diagram of a display interface of a screen sharing party according to an embodiment of this disclosure.

FIG. 10 is a diagram of a display interface of a screen sharing party according to an embodiment of this disclosure. As shown in FIG. 10, after the screen sharing party (that is, the screen projection party in other embodiments) completes screen projection, an identifier of a screen projection check status is returned in a session list 1001 on a current projection screen 1000. The identifier of the screen projection check status may include "OK", "Error", and "Checking". "OK" indicates that screen projection has succeeded, "Error" indicates that screen projection check has a problem or screen projection fails, and "Checking" indicates that check is in progress.

Figure 11:
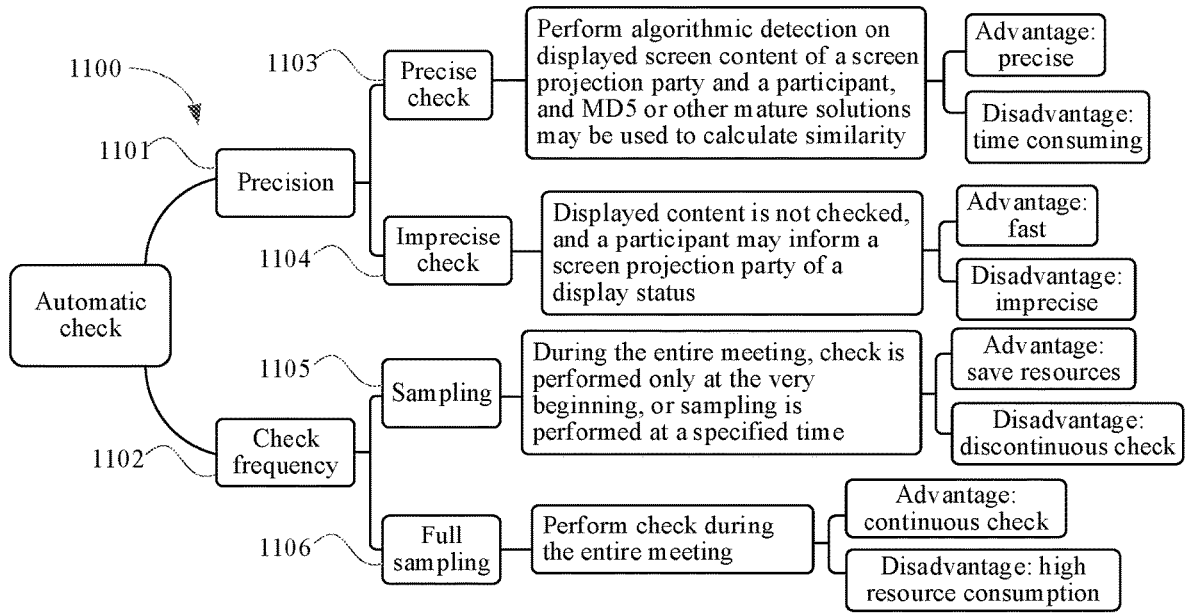
FIG. 11 is a diagram of classification of check solutions according to an embodiment of this disclosure.

FIG. 11 is a diagram of classification of check solutions 1100 according to an embodiment of this disclosure. As shown in FIG. 11, in this embodiment of this disclosure, according to check precision 1101, there are two types of detection methods: a first type is a precise check solution 1103, and a second type is an imprecise check solution 1104. According to check frequency 1102, there may be also two types of detection methods: a first type is a sampling check solution 1105, and a second type is a full sampling check solution 1106.

(1) In the precise check solution 1103:

Content displayed on screens of the screen projection party and the participant is detected based on an algorithm. For example, similarity between the content displayed on the screens of the screen projection party and the participant may be calculated based on an MD5 algorithm or other algorithms. An advantage of this method is that detection is precise, and a disadvantage of this method is that detection is time consuming.

For example, a host A of the screen projection party initiates a check request to a participant B and a participant C (for example, the following code):

```
{
    ReqID:0001; //check ID
    checkcode: A4C566F849A3B1538384912E9BB7ECF9 //checkcode;
}
```

The check code herein may be obtained mainly by using an MD5 algorithm in this embodiment of this disclosure, and a MD5 value of an image displayed by the screen projection party A is calculated as the check code. Certainly, the check code may also be calculated based on other algorithms, for example, an algorithm only for checking similarity between images.

After receiving the check request (that is, the screen projection status detection request), the participant B and the participant C start to check screen projection statuses according to the same check code algorithm, and then return check results. If the calculated MD5 values are equal, return OK. A process of returning the check result is shown in the following code:

```
{
    ReqID:0001; //check ID
    checkresult: Ok|error //checkcode;
}
```

After receiving the returned check result, the host of the screen projection party may feedback the check status in a meeting list.

(2) Imprecise check solution 1104:

Displayed content is not checked, and the participant only needs to inform the screen projection party of a display status. An advantage of this method is that detection is fast, and a disadvantage of this method is that detection is imprecise.

For example, the host A of the screen projection party initiates a check request to the participant B and the participant C, where the check request may not carry check code (for example, the following code):

```
{
    ReqID:0001; //check ID
}
```

After receiving the check request, the participant B and the participant C directly return check statuses according to return results of program logic of the participants. The method in this embodiment of this disclosure is a method that relies on feedback of the participant (for example, the following code):

```
{
    ReqID:0001; //check ID
    checkresult: Ok|error //checkcode;
}
```

After receiving the returned check result, the host of the screen projection party may feed back the check status in a meeting list.

(3) Full sampling check solution 1106:

Check is enabled throughout the entire meeting. An advantage of this method is continuous check, and a disadvantage of this method is high resource consumption.

The host A of the screen projection party continuously initiates the check request to the participant B and the participant C according to a time interval (for example, the following code):

```
{
  ReqID:0001; //check ID
  checkcode: A4C566F849A3B1538384912E9BB7ECF9 //checkcode;
}
{
  ReqID:0002; //check ID
  checkcode: A4C566F849A3B1538384912E9BB7ECF8 //checkcode;
}
{
  ReqID:0003; //check ID
  checkcode: A4C566F849A3B1538384912E9BB7ECF7 //checkcode;
}
```

After receiving the check request, the participant B and the participant C continuously respond to each request (for example, the following code):

```
{
    eqID:0001; //check ID
    checkresult: Ok|error //checkcode;
}
{
    eqID:0002; //check ID
    checkresult: Ok|error //checkcode;
}
{
    eqID:0003; //check ID
    checkresult: Ok|error //checkcode;
}
```

After receiving the returned check result, the host of the screen projection party may continuously update feedback of the check status in a meeting list.

(4) Sampling check solution 1105:

During the entire meeting, check is performed only at the very beginning, or sampling check is performed at a specified time. An advantage of this method is that resources are saved, and a disadvantage of this method is discontinuous check. The sampling check solution is similar to the foregoing full sampling check solution, except that the number of times of sampling is reduced.

The screen projection status determining method provided by this embodiment of this disclosure can improve the efficiency of an online meeting. After screen projection is started, there is no need to confirm "can you see my screen?" again in the entire screen projection process. Moreover, at least four solutions may be provided from the two perspectives of precision and continuation. During a meeting, if some users experience abnormal screen projection, the users may also feed back this to the screen projection party to implement real-time monitoring during the entire meeting.

The following continues to describe an exemplary structure of the screen projection status determining apparatus 354 implemented as software modules provided by the embodiments of this disclosure. In some embodiments, As shown in FIG. 3, software modules of the screen projection status determining apparatus 354 stored in the memory 350 may form the screen projection status determining apparatus in the first terminal 100-1, and include: a processing module 3541, configured to: in response to a screen projection sharing operation, display screen projection sharing information on a current interface, and transmit shared data corresponding to the screen projection sharing information to at least one second terminal of a receiving party, the shared data being used for screen projection sharing; and a display module 3542, configured to display, on the current interface during screen projection sharing, a status identifier corresponding to a current screen projection status of each second terminal.

In some embodiments, the apparatus further includes: a first sending module, configured to: when sending the shared data to the at least one second terminal, send a screen projection status detection request to each second terminal, where the screen projection status detection request includes current projected data corresponding to the shared data; a first receiving module, configured to receive detected data that corresponds to the current projected data and that is sent by each second terminal, where the detected data is used to respond to the screen projection status detection request; and a first determining module, configured to determine, according to the detected data of each second terminal and the current projected data, the current screen projection status corresponding to the second terminal.

In some embodiments, the first sending module is further configured to periodically transmit the screen projection status detection request to each second terminal; or send, in response to a trigger operation received by the first terminal, the screen projection status detection request to each second terminal, where the trigger operation is used to trigger screen projection status detection; or send, when the screen projection sharing operation is received, the screen projection status detection request to each second terminal in response to the screen projection sharing operation; or send a next screen projection status detection request to any second terminal after receiving detected data that corresponds to a screen projection status detection request of a current moment and that is returned by the corresponding second terminal.

In some embodiments, the current projected data is a projected image, and the detected data is an image currently displayed by the second terminal; and the first determining module is further configured to determine image similarity between the projected image and the image displayed by each second terminal; and when the image similarity is greater than a first similarity threshold, determine that the current screen projection status corresponding to the second terminal is successful screen projection.

In some embodiments, the current projected data is a projected video, and the detected data is an image currently displayed by the second terminal; and the first determining module is further configured to determine video frame similarity between a currently displayed frame of the projected video and the image displayed by each second terminal; and when the video frame similarity is greater than a second similarity threshold, determine that the current screen projection status corresponding to the second terminal is successful screen projection.

In some embodiments, the current projected data is a first data volume of the shared data sent by the first terminal, and the detected data is a second data volume of data received by the second terminal; and the first determining module is further configured to determine a difference between the second data volume of each second terminal and the first data volume; and when a volume difference is less than a data volume threshold, determine that the current screen projection status corresponding to the second terminal is successful screen projection.

In some embodiments, the current projected data is a first data digest of the shared data, and the detected data at least includes a second data digest of content currently displayed by the second terminal; and the first determining module is further configured to: when the second data digest of any second terminal is the same as the first data digest, or when a difference between the second data digest of any second terminal and the first data digest is less than a data digest threshold, determine that the current screen projection status corresponding to the second terminal is successful screen projection.

In some embodiments, the apparatus further includes: a data digest determining module, configured to: before determining the current screen projection status corresponding to the second terminal, determine the first data digest of the shared data; or when the detected data includes an image currently displayed by the second terminal, determine a third data digest of the displayed image, and determine, according to the third data digest of the displayed image of each second terminal and the first data digest of the shared data, a current screen projection status corresponding to the second terminal.

In some embodiments, the apparatus further includes: a screen display status obtaining module, configured to obtain a current screen display status of each second terminal; and a failed screen projection determining module, configured to: when the screen display status of any second terminal is abnormal, determine that the current screen projection status corresponding to the second terminal is failed screen projection.

In some embodiments, the apparatus further includes: a detection status determining module, configured to: after transmitting the screen projection status detection request to the second terminal and before receiving the detected data returned by the second terminal, determine that the current screen projection status of the second terminal is a detection status; and the failed screen projection determining module is further configured to: when the detected data returned by the second terminal is not received within a preset time period, determine that the current screen projection status of the second terminal is failed screen projection.

In some other embodiments, the second terminal 100-2 and the second terminal 100-3 may have the same structure as the first terminal 100-1 (not shown in the figure), and the difference only lies in a screen projection status determining apparatus stored in the memory in the second terminal 100-2 or the second terminal 100-3. The screen projection status determining apparatus may be a screen projection status determining apparatus in the second terminal 100-2 or the second terminal 100-3, and may be software in the form of programs and plug-ins and include the following software modules: a second receiving module, configured to: in a process of receiving the shared data sent by the first terminal, receive a screen projection status detection request sent by the first terminal, where the screen projection status detection request includes current projected data corresponding to the shared data; a detection module, configured to detect data currently received by the second terminal, to obtain second detected data; a second determining module, configured to determine a current screen projection status of the second terminal according to the detected data and current projected data; and a second sending module, configured to send the current screen projection status to the first terminal.

The description of the apparatus in this embodiment of this disclosure is similar to that of the above method embodiment, and has beneficial effects similar to those of the method embodiment. For technical details not disclosed in the apparatus embodiment, refer to the description of the method embodiment of this disclosure for understanding.

An embodiment of this disclosure provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the foregoing screen projection status determining methods of the embodiments of this disclosure.

The embodiments of this disclosure provide a storage medium storing executable instructions, where the executable instructions are stored, and when the executable instructions are executed by a processor, the processor is caused to perform the screen projection status determining method of the embodiments of this disclosure, for example, the methods shown in FIG. 4A and FIG. 4B.

In some embodiments, the storage medium may be a computer-readable storage medium, for example, a ferromagnetic random access memory (FRAM), a read only memory (ROM), a programmable read only memory (PROM), an erasable programmable read only memory (EPROM), an electrically erasable programmable read only memory (EEPROM), a flash memory, a magnetic surface memory, an optical disk, or a compact disk-read only memory (CD-ROM), or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A method for determining screen projection status, performed by a first terminal, comprising:
    in response to a screen projection sharing operation, displaying screen projection sharing information on a current interface of the first terminal, and transmitting shared data corresponding to the screen projection sharing information to at least one second terminal, the shared data comprises data to be displayed on the at least one second terminal for screen projection sharing of the shared data with the at least one second terminal; performing screen projection sharing;
    transmitting a screen projection status detection request to one of the at least one second terminal, wherein the screen projection status detection request represents a request to detect the current screen projection status of a second terminal and comprises current projected data corresponding to the shared data for displaying on the first terminal, the current screen projection status comprising information on whether a screen projection sharing of the shared data is successful on a second terminal;
    receiving detected data corresponding to the current projected data and being transmitted by the one of the at least one second terminal, wherein the detected data represents current projected data corresponding to the shared data for displaying on the at least one second terminal; and
    determining, according to the detected data of a second terminal and the current projected data corresponding to the shared data for displaying on the first terminal, the current screen projection status corresponding to the one of the at least one second terminal; and
    displaying, on the current interface of the first terminal, a status identifier corresponding to a current screen projection status of the one of the at least one second terminal.

2. The method according to claim 1, further comprising:
    transmitting the screen projection status detection request to each of the at least one second terminal;
    receiving detected data corresponding to the current projected data and being transmitted by each of the at least one second terminal; and
    determining, according to the detected data of each of the at lease one second terminal and the current projected data, the current screen projection status corresponding to each of the at least one second terminal.

3. The method according to claim 2, wherein the transmitting the screen projection status detection request to the each second terminal comprises:
    periodically transmitting the screen projection status detection request to each second terminal.

4. The method according to claim 2, wherein the transmitting the screen projection status detection request to the each second terminal comprises:
    transmitting, in response to receiving a trigger operation, the screen projection status detection request to each of the at least one second terminal, wherein the trigger operation is for triggering screen projection status detection.

5. The method according to claim 2, wherein the transmitting the screen projection status detection request to the each second terminal comprises:
    in response to receiving the screen projection sharing operation, transmitting the screen projection status detection request to the each second terminal.

6. The method according to claim 2, wherein the transmitting the screen projection status detection request to the each second terminal comprises:
    transmitting a next screen projection status detection request to a second terminal after receiving detected data that corresponds to a screen projection status detection request of a current moment and that is returned by the corresponding second terminal.

7. The method according to claim 2, wherein the current projected data is a projected image, and the detected data is an image currently displayed by the second terminal; and
    the determining the current screen projection status corresponding to the second terminal comprises:
        determining image similarity between the projected image and the image displayed by each second terminal; and
        in response to the image similarity being greater than a first similarity threshold, determining that the current screen projection status corresponding to the second terminal is a successful screen projection.

8. The method according to claim 2, wherein the current projected data is a projected video, and the detected data is an image currently displayed by the second terminal; and
    the determining the current screen projection status corresponding to the second terminal comprises:
        determining video frame similarity between a currently displayed frame of the projected video and the image displayed by each second terminal; and
        in response to the video frame similarity being greater than a second similarity threshold, determining that the current screen projection status corresponding to the second terminal is a successful screen projection.

9. The method according to claim 2, wherein the current projected data is a first data volume of the shared data transmitted by the first terminal, and the detected data is a second data volume of data received by the second terminal; and the determining the current screen projection status corresponding to the second terminal comprises:
determining a difference between the second data volume of the each second terminal and the first data volume; and
in response to a volume difference being less than a data volume threshold, determining that the current screen projection status corresponding to the second terminal is a successful screen projection.

10. The method according to claim 2, wherein the current projected data is a first data digest of the shared data, and the detected data at least comprises a second data digest of content currently displayed by the second terminal; and the determining the current screen projection status corresponding to the second terminal comprises:
in response to the second data digest of a second terminal being the same as the first data digest, or a difference between the second data digest of a second terminal and the first data digest being less than a data digest threshold, determining that the current screen projection status corresponding to the second terminal is a successful screen projection.

11. The method according to claim 10, further comprising:
before determining the current screen projection status corresponding to the second terminal, determining the first data digest of the shared data.

12. The method according to claim 10, further comprising:
in response to the detected data comprising an image currently displayed by the second terminal, determining a third data digest of the displayed image, and determining the third data digest of the displayed image as the second data digest of the second terminal.

13. The method according to claim 1, further comprising:
obtaining a current screen display status of each second terminal; and
in response to the screen display status of a second terminal being abnormal, determining that the current screen projection status corresponding to the second terminal is a failed screen projection.

14. The method according to claim 1, further comprising:
after transmitting the screen projection status detection request to the second terminal and before receiving the detected data returned by the second terminal, determining that the current screen projection status of the second terminal is a detection status; and
in response to the detected data returned by the second terminal being not received within a preset time period, determining that the current screen projection status of the second terminal is a failed screen projection.

15. A first terminal comprising:
a memory operable to store computer-readable instructions; and
a processor circuitry operable to read the computer-readable instructions, the processor circuitry when executing the computer-readable instructions is configured to:
in response to a screen projection sharing operation, display screen projection sharing information on a current interface of the first terminal, and transmit shared data corresponding to the screen projection sharing information to at least one second terminal, the shared data comprises data to be displayed on the at least one second terminal for screen projection sharing of the shared data with the at least one second terminal;
perform screen projection sharing;
transmit a screen projection status detection request to one of the at least one second terminal, wherein the screen projection status detection request represents a request to detect the current screen projection status of a second terminal and comprises current projected data corresponding to the shared data for displaying on the first terminal, the current screen projection status comprising information on whether a screen projection sharing of the shared data is successful on a second terminal;
receive detected data corresponding to the current projected data and being transmitted by the one of the at least one second terminal, wherein the detected data represents current projected data corresponding to the shared data for displaying on the at least one second terminal; and
determine, according to the detected data of a second terminal and the current projected data corresponding to the shared data for displaying on the first terminal, the current screen projection status corresponding to the one of the at least one second terminal; and
display, on the current interface of the first terminal, a status identifier corresponding to a current screen projection status of the one of the at least one second terminal.

16. The first terminal according to claim 15, the processor circuitry is further configured to:
transmit the screen projection status detection request to each of the at least one second terminal;
receive detected data corresponding to the current projected data and being transmitted by each of the at least one second terminal; and
determine, according to the detected data of each of the at least one second terminal and the current projected data, the current screen projection status corresponding to each of the at least one second terminal.

17. The first terminal according to claim 16, wherein the current projected data is a projected image, and the detected data is an image currently displayed by the second terminal; and the processor circuitry is configured to:
determine image similarity between the projected image and the image displayed by each second terminal; and
in response to the image similarity being greater than a first similarity threshold, determine that the current screen projection status corresponding to the second terminal is a successful screen projection.

18. The first terminal according to claim 16, wherein the current projected data is a projected video, and the detected data is an image currently displayed by the second terminal; and the processor circuitry is configured to:
determine video frame similarity between a currently displayed frame of the projected video and the image displayed by each second terminal; and
in response to the video frame similarity being greater than a second similarity threshold, determine that the current screen projection status corresponding to the second terminal is a successful screen projection.

19. The first terminal according to claim 16, wherein the current projected data is a first data volume of the shared data transmitted by the first terminal, and the detected data is a second data volume of data received by the second terminal; and the processor circuitry is configured to:
determine a difference between the second data volume of the each second terminal and the first data volume; and in response to a volume difference being less than a data volume threshold, determine that the current screen projection status corresponding to the second terminal is a successful screen projection.

20. A non-transitory computer-readable media, having instructions stored on the computer-readable media, the instructions configured to, when executed, cause a first terminal to:

in response to a screen projection sharing operation, display screen projection sharing information on a current interface of the first terminal, and transmit shared data corresponding to the screen projection sharing information to at least one second terminal, the shared data comprises data to be displayed on the at least one second terminal for screen projection sharing of the shared data with the at least one second terminal; and perform screen projection sharing;

transmit a screen projection status detection request to one of the at least one second terminal, wherein the screen projection status detection request represents a request to detect the current screen projection status of a second terminal and comprises current projected data corresponding to the shared data for displaying on the first terminal, the current screen projection status comprising information on whether a screen projection sharing of the shared data is successful on a second terminal;

receive detected data corresponding to the current projected data and being transmitted by the one of the at least one second terminal, wherein the detected data represents current projected data corresponding to the shared data for displaying on the at least one second terminal; and determine, according to the detected data of a second terminal and the current projected data corresponding to the shared data for displaying on the first terminal, the current screen projection status corresponding to the one of the at least one second terminal; and display, on the current interface of the first terminal, a status identifier corresponding to a current screen projection status of each second terminal.

\* \* \* \* \*